US012758057B2

(12) United States Patent
Leendertse

(10) Patent No.: US 12,758,057 B2
(45) Date of Patent: Oct. 13, 2026

(54) SOAP HOLDING APPARATUS AND ASSOCIATED METHODS OF MANUFACTURE AND USE

(71) Applicant: Paul Leendertse, Vittoria (CA)

(72) Inventor: Paul Leendertse, Vittoria (CA)

( * ) Notice: Subject to any disclaimer, the term of this patent is extended or adjusted under 35 U.S.C. 154(b) by 0 days.

(21) Appl. No.: 18/821,149

(22) Filed: Aug. 30, 2024

(65) Prior Publication Data

US 2026/0060481 A1 Mar. 5, 2026

(51) Int. Cl.
*F16M 11/00* (2006.01)
*A47K 5/04* (2006.01)
*F16M 11/24* (2006.01)

(52) U.S. Cl.
CPC ............... *A47K 5/04* (2013.01); *F16M 11/24* (2013.01)

(58) Field of Classification Search
CPC ........................................................ A47K 5/04
See application file for complete search history.

(56) References Cited

U.S. PATENT DOCUMENTS 1,889,501 A 11/1932 Schnake
2,461,374 A 2/1949 Custer
2,475,500 A 7/1949 Heliote
2,586,626 A 2/1952 Dunn
2,606,393 A 8/1952 Lawrence
D171,659 S * 3/1954 Neagle ........................ D6/681.1
3,169,743 A 2/1965 Page, Jr.
3,177,048 A 4/1965 Whatley
3,476,254 A 11/1969 Gaffney
4,177,965 A 12/1979 Blaszkowski
4,277,042 A 7/1981 Ash, Sr.
4,309,014 A 1/1982 Blaszkowski
4,458,871 A 7/1984 van Allen
4,588,075 A 5/1986 Rupp
4,775,124 A 10/1988 Hicks
(Continued)

FOREIGN PATENT DOCUMENTS

AU 2012100596 A4 6/2012
CN 2684735 Y 3/2005
(Continued)

OTHER PUBLICATIONS

"Bidet Wipes Door With Satin Glass Soap Case", by IDEARBA, Found Online on [Nov. 6, 2024] https://idearba.com/721-large_default/bidet-wipes-door-with-satin-glass-soap-case-minimal-line-decor.jpg.

(Continued)

*Primary Examiner* — Amy J. Sterling
(74) *Attorney, Agent, or Firm* — LegalForce RAPC Worldwide

(57) ABSTRACT

Disclosed is a soap holding apparatus and associated methods of manufacture and use. According to one embodiment, a soap holding apparatus includes a vertical post extending upward from a base. A plurality of suspension arms affixed laterally on the vertical post to hold a bar of soap. Each of the plurality of suspension arms includes a first segment laterally affixed to the vertical post and a second segment extending from a distal end of the first segment at an obtuse angle. A short lean arm is laterally affixed to the vertical post above the suspension arms to support the bar of soap. A long lean arm is laterally affixed to the vertical post above the short lean arm to support the bar of soap.

14 Claims, 9 Drawing Sheets

(56) References Cited

U.S. PATENT DOCUMENTS

| | | | | |
|---|---|---|---|---|
| 4,993,546 | A | 2/1991 | Southard | |
| 5,020,753 | A * | 6/1991 | Green | A47K 5/05 248/176.1 |
| 5,242,064 | A | 9/1993 | Martell | |
| 5,417,397 | A | 5/1995 | Harnett | |
| 6,152,294 | A | 11/2000 | Weinberg | |
| D664,374 | S * | 7/2012 | Capella | D6/681.3 |
| D683,096 | S * | 5/2013 | Stumpo | D32/58 |
| 8,523,125 | B1 | 9/2013 | Jardine | |
| 9,375,626 | B2 * | 6/2016 | English | A63B 21/072 |
| 10,357,132 | B1 | 7/2019 | Martin | |
| 10,729,226 | B1 * | 8/2020 | Zamora | A45F 3/44 |
| D1,039,885 | S * | 8/2024 | Mironenko | D6/681.1 |
| 2007/0056862 | A1 | 3/2007 | Jones | |
| 2008/0191120 | A1 | 8/2008 | Wright | |
| 2011/0101199 | A1 | 5/2011 | Andrade | |
| 2015/0008297 | A1 | 1/2015 | Baggs | |

FOREIGN PATENT DOCUMENTS

| | | | |
|---|---|---|---|
| CN | 201005594 | Y | 1/2008 |
| CN | 201356490 | Y | 12/2009 |
| CN | 202044183 | U | 11/2011 |
| CN | 103126589 | A | 6/2013 |
| CN | 103330525 | A | 10/2013 |
| CN | 103767607 | A | 5/2014 |
| CN | 203762976 | U | 8/2014 |
| CN | 203873655 | U | 10/2014 |
| CN | 105411452 | A | 3/2016 |
| CN | 216364863 | U | 4/2022 |
| JP | 2004008758 | A | 1/2004 |
| KR | 20120041822 | A | 5/2012 |
| KR | 101153433 | B1 | 6/2012 |
| KR | 20120128778 | A | 11/2012 |
| KR | 101655755 | B1 | 9/2016 |
| KR | 20200002798 | U | 12/2020 |
| KR | 102400972 | B1 | 5/2022 |
| WO | 2013025255 | A1 | 2/2013 |
| WO | 2023230652 | A1 | 12/2023 |

OTHER PUBLICATIONS

"Bamboo Soap Dish Bar Soap Holder", by Vesici, Found Online on [Nov. 6, 2024] https://m.media-amazon.com/images/I/71FhpxydhBL._SX569_.jpg.

"Waterfall Soap Dish That Drains", by Cloud 107, Found Online on [Nov. 6, 2024] https://m.media-amazon.com/images/I/71xFWM9fbRL._SX569_.jpg.

"Soap Holder Leaf-Shape Self Draining Soap Dish Holder", by YSSY, Found Online on [Nov. 6, 2024] https://m.media-amazon.com/images/1/310nRIF59IL.jpg.

* cited by examiner

SOAP HOLDING APPARATUS AND ASSOCIATED METHODS OF MANUFACTURE AND USE

FIELD OF TECHNOLOGY

This disclosure relates generally to toiletry accessories and, more particularly, to a soap bar holding apparatus device and associated methods of manufacture and use.

BACKGROUND

A soap holder may be an apparatus designed to hold and/or store a bar of soap. The soap holder may be used as a designated area to keep soap between uses. The soap holder may be made from various materials including but not limited to plastic, metal, ceramic, and/or bamboo. The soap holder may be mounted on walls, placed on countertops, and/or integrated into shower fixtures. The soap holder may not only serve a practical purpose but also add a decorative element to a bathroom and/or kitchen.

Soap holders may accumulate soap residue, water, and/or scum, which may make the soap holders inconvenient, unclean, unattractive, messy, and/or hard to clean. An unclean soap holder may in turn create a breeding ground for bacteria while reducing soap hygiene. If the soap holder lacks adequate drainage, water may hold on the holder's surface and may allow water to pool at the bottom, and/or allow water to accumulate on the soap holder's surface contact points. The soap may become soggy and/or dissolve faster due to the excess water and lack of drying. Some soap holders may be too small to hold larger bars of soap and/or soap that shrinks from use. Lightweight and/or poorly designed holders may tip over easily, which may cause the soap to fall out. Depending on the material, the soap holders may corrode, rust, and/or degrade over time with frequent water exposure and may cause allergic reactions in individuals and/or users. Some designs of the soap holders may not hold the soap securely, which may cause the soap to slip out easily and may be inconvenient.

Wall-mounted soap holders may cause damage to tiles and/or walls if not installed correctly. Adhesive soap holders may also leave a sticky residue and/or damage surfaces when removed. Wall-mounted magnetic soap holders may secure the soap by attaching a magnet to the bar of the soap and may exhibit limited compatibility with certain materials and/or soap types and/or cause metal components to rust. The magnet within the soap may cause the soap to crack and/or break and may not always hold the soap securely as the soap gets smaller. The magnet itself may be uncomfortable to hold when attached to the soap and may be uncomfortable on the body when using the soap it is attached to.

As such, soap may be wasted and/or used less frequently and/or effectively, which may lead to wasted money and the spread of germs, potentially harming users and their homes.

SUMMARY

Disclosed is a soap holding apparatus and associated methods of manufacture and use.

In one aspect, a soap holding apparatus includes a vertical post extending upward from a base. The vertical post includes a free end at an uppermost edge. A plurality of suspension arms are affixed laterally on the vertical post to hold a bar of soap. Each of the plurality of the suspension arms is divided into two segments. Each of the plurality of suspension arms includes a first segment that laterally affixes each of the plurality of suspension arms to the vertical post. Each of the plurality of suspension arms includes a second segment extending from a distal end of the first segment at an obtuse angle. A short lean arm is laterally affixed to the vertical post above the suspension arms to support the bar of soap. A long lean arm is laterally affixed to the vertical post above the short lean arm to support the bar of soap.

The soap holding apparatus may include a drip tray that may be laterally affixed to a slot on the vertical post below the plurality of suspension arms. The drip tray may collect water dripping from the bar of soap when the bar of soap is held by the plurality of suspension arms. The drip tray may be removably attached to the slot on the vertical post below the suspension arms. The drip tray may be attached to the vertical post below a lower end of the vertical post. The drip tray may be the base for the soap holding apparatus.

The second segment may extend from the distal end of the first segment to create the obtuse angle. The obtuse angle may range between 130 degrees and 180 degrees to support the bar of soap and/or to prevent the bar of soap from slippage. The base may include a plurality of legs extending outwardly from the lower end of the vertical post to support the soap holding apparatus. The soap holding apparatus may be made from plastic, stainless steel, aluminum, titanium, wood, and/or ceramic material.

In another aspect, a soap holding apparatus includes a horizontal arm extending outward from a center of a bracket. A vertical post extends upward from the distal end of the horizontal arm. A plurality of suspension arms are affixed laterally to the vertical post to hold a bar of soap. Each of the plurality of the suspension arms is divided into two segments. Each of the plurality of suspension arms includes a first segment laterally affixed to the vertical post. Each of the plurality of suspension arms includes a second segment extending at a distal end of the first segment at an obtuse angle. A short lean arm is laterally affixed to the vertical post above the plurality of suspension arms to support the bar of soap. A long lean arm is laterally affixed to the vertical post above the short lean arm to support the bar of soap.

The bracket may be attached to an edge of the horizontal arm to affix the soap holding apparatus to a surface. The bracket may include one or more holes to allow insertion of the screws, bolts, and/or suction cups to allow the soap holding apparatus to be affixed to the surface. The bracket may be affixed to the surface by the screws, the suction cups, and/or the bolts.

In yet another aspect, a soap holding apparatus includes a vertical post mounted on a surface in an upright position. A bracket is attached to the vertical post at a lap joint to affix the soap holding apparatus to the surface. The bracket and the vertical post overlap and interlock to securely connect the bracket to the vertical post. A plurality of suspension arms are laterally affixed to the vertical post to hold a bar of soap. Each of the plurality of the suspension arms is divided into two segments. Each of the plurality of suspension arms includes a first segment to laterally affix each of the plurality of suspension arms to the vertical post. Each of the plurality of suspension arms includes a second segment extending from a distal end of the first segment at an obtuse angle. A short lean arm is laterally affixed to the vertical post above the suspension arms to support the bar of soap. A long lean arm is laterally affixed to the vertical post above the short lean arm to support the bar of soap.

The bracket and the vertical post may be secured at the lap joint by an adhesive, a screw, a nail, a frictional force, a hook-and-loop fastener, an interlocking tab and slot mechanism, and/or a snap-fit connection.

In a further aspect, a method of manufacturing a soap holding apparatus includes extending a vertical post upward from a base, the vertical post including a free end at an uppermost edge. The method includes affixing a plurality of suspension arms laterally on the vertical post to hold a bar of soap. Each of the plurality of the suspension arms is divided into two segments. Each of the plurality of suspension arms includes a first segment to laterally affix each of the plurality of suspension arms horizontally to the vertical post. Each of the plurality of suspension arms includes a second segment extending from a distal end of the first segment at an obtuse angle. A short lean arm is affixed laterally to the vertical post above the suspension arms to support the bar of soap. A long lean arm is affixed laterally to the vertical post above the short lean arm to support the bar of soap.

The method of forming the soap holding apparatus may include attaching a drip tray to the vertical post below a lower end of the vertical post. The drip tray may be the base and support the vertical post and all of its appendages.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
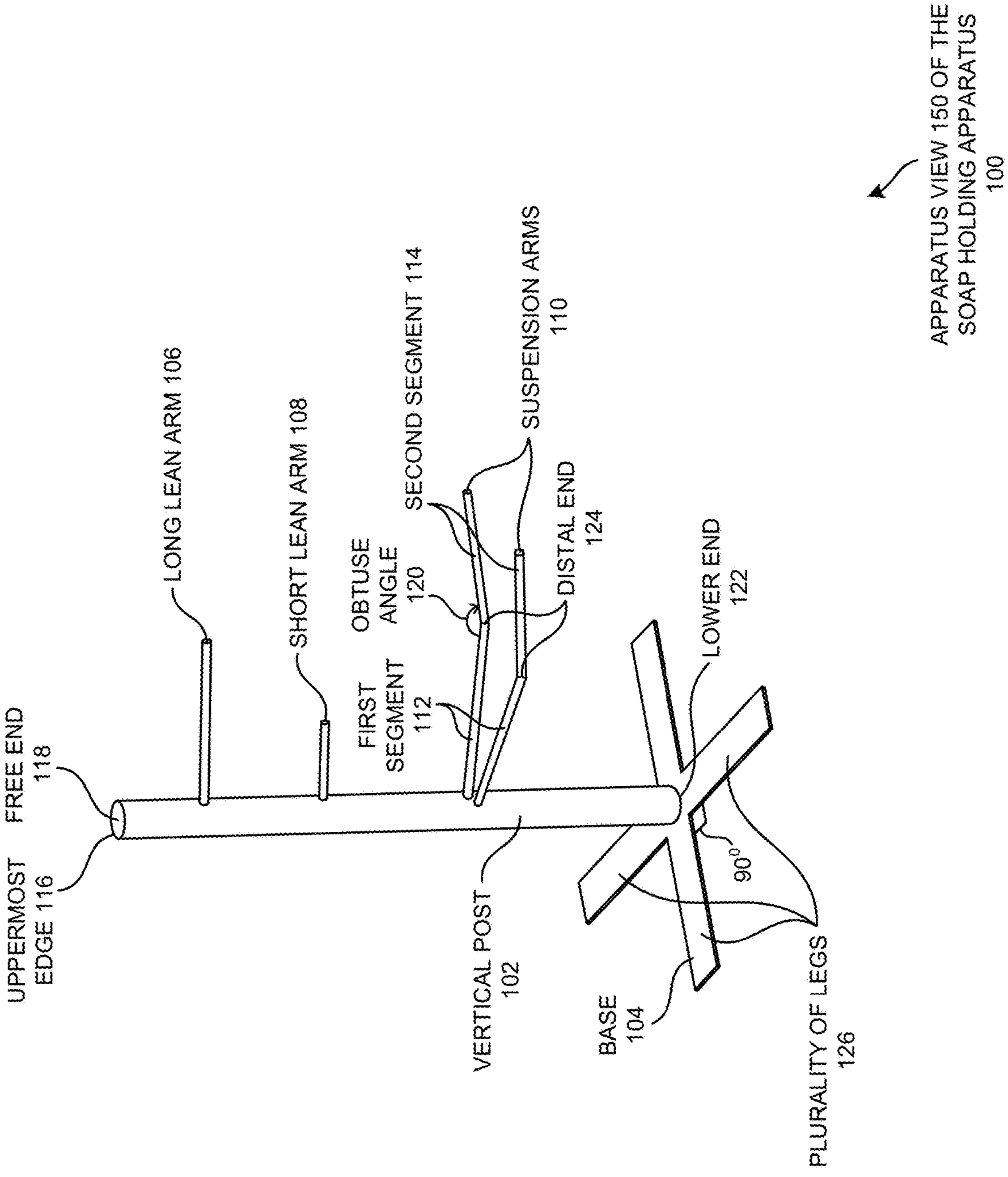
FIG. 1 is an apparatus view of a soap holding apparatus illustrating the components forming the apparatus, according to one or more embodiments.

Other features of the present embodiments will be apparent from the accompanying drawings and from the detailed description that follows.

DETAILED DESCRIPTION

Example embodiments, as described below, may be used to provide a method and/or a soap holding apparatus to hold and dry a soap bar of various sizes and/or shapes.

In one embodiment, a soap holding apparatus 100 includes a vertical post 102 extending upward from a base 104. The vertical post 102 includes a free end 118 at an uppermost edge 116. A plurality of suspension arms 110 are affixed laterally on the vertical post 102 to hold a bar of soap. Each of the plurality of the suspension arms 110 is divided into two segments. Each of the plurality of suspension arms 110 includes a first segment 112 that laterally affixes each of the plurality of suspension arms 110 to the vertical post 102. Each of the plurality of suspension arms 110 includes a second segment 114 extending from a distal end 124 of the first segment 112 at an obtuse angle 120. A short lean arm 108 is laterally affixed to the vertical post 102 above the suspension arms 110 to support the bar of soap. A long lean arm 106 is laterally affixed to the vertical post 102 above the short lean arm 108 to support the bar of soap.

The soap holding apparatus 100 may include a drip tray 306 that may be laterally affixed to a slot 304 on the vertical post 102 below the plurality of suspension arms 110. The drip tray 306 may collect water dripping from the bar of soap when the bar of soap is held by the plurality of suspension arms 110. The drip tray 306 may be removably attached to the slot 304 on the vertical post 102 below the suspension arms 110. The drip tray 306 may be attached to the vertical post 102 at a lower end 122 of the vertical post 102. The drip tray 306 may be the base for the soap holding apparatus 100.

The second segment 114 may extend from the distal end 124 of the first segment 112 to create the obtuse angle 120. The obtuse angle 120 may range between 130 degrees and 180 degrees to support the bar of soap and/or to prevent the bar of soap from slippage. The base 104 may include a plurality of legs 126 extending outwardly from the lower end 122 of the vertical post 102 to support the soap holding apparatus 100. The soap holding apparatus 100 may be made from plastic, stainless steel, aluminum, titanium, wood, and/or ceramic material.

In another embodiment, a soap holding apparatus 500 includes a horizontal arm 502 extending outward from a center 512 of a bracket 506. A vertical post 102 extending upward from the distal end 514 of the horizontal arm 502. A plurality of suspension arms 110 are affixed laterally to the vertical post 102 to hold a bar of soap. Each of the plurality of the suspension arms 110 is divided into two segments. Each of the plurality of suspension arms 110 includes a first segment 112 laterally affixed to the vertical post 102. Each of the plurality of suspension arms 110 includes a second segment 114 extending at a distal end 124 of the first segment 112 at an obtuse angle 120. A short lean arm 108 is laterally affixed to the vertical post 102 above the plurality of suspension arms 110 to support the bar of soap. A long lean arm 106 is laterally affixed to the vertical post 102 above the short lean arm 108 to support the bar of soap.

The bracket 506 may be attached to an edge 504 of the horizontal arm 502 to affix the soap holding apparatus 100 to a surface. The bracket 506 may include one or more hole 510 to allow insertion of the screws, bolts, and/or suction cups 508 to allow the soap holding apparatus 100 to be affixed to the surface. The bracket 506 may be affixed to the surface by the screws, the suction cups 508, and/or the bolts.

In yet another embodiment, a soap holding apparatus 100 includes a vertical post 102 mounted on a surface in an upright position. A bracket 602 is attached to the vertical post 102 at a lap joint 604 to affix the soap holding apparatus 100 to the surface. The bracket 602 and the vertical post 102 overlap and interlock to securely connect the bracket 602 to the vertical post 102. A plurality of suspension arms 110 are laterally affixed to the vertical post 102 to hold a bar of soap. Each of the plurality of the suspension arms 110 is divided into two segments. Each of the plurality of suspension arms 110 includes a first segment 112 to laterally affix each of the plurality of suspension arms 110 to the vertical post 102. Each of the plurality of suspension arms 110 includes a second segment 114 extending from a distal end 124 of the first segment 112 at an obtuse angle 120. A short lean arm 108 is laterally affixed to the vertical post 102 above the suspension arms 110 to support the bar of soap. A long lean arm 106 is laterally affixed to the vertical post 102 above the short lean arm 108 to support the bar of soap.

The bracket 602 and the vertical post 102 may be secured at the lap joint 604 by an adhesive, a screw, a nail, a frictional force, a hook-and-loop fastener, an interlocking tab and slot 304 mechanism, and/or a snap-fit connection.

In a further embodiment, a method of manufacturing a soap holding apparatus 100 includes extending a vertical post 102 upward from a base 104, the vertical post 102 including a free end 118 at an uppermost edge 116. The method includes affixing a plurality of suspension arms 110 laterally on the vertical post 102 to hold a bar of soap. Each of the plurality of the suspension arms 110 is divided into two segments. Each of the plurality of suspension arms 110 includes a first segment 112 to laterally affix each of the plurality of suspension arms 110 horizontally to the vertical post 102. Each of the plurality of suspension arms 110 includes a second segment 114 extending from a distal end 124 of the first segment 112 at an obtuse angle 120. A short lean arm 108 is affixed laterally to the vertical post 102 above the suspension arms 110 to support the bar of soap. A long lean arm 106 is affixed laterally to the vertical post 102 above the short lean arm 108 to support the bar of soap.

The method of forming the soap holding apparatus 100 may include attaching a drip tray 306 to the vertical post 102 below a lower end 122 of the vertical post 102. The drip tray 306 may be the base and support the vertical post 102 and all of its appendages.

FIG. 1 is an apparatus view of a soap holding apparatus 100 illustrating the components forming the apparatus, according to one or more embodiments. As shown in FIG. 1, the soap holding apparatus 100 comprises a vertical post 102, a base 104, a long lean arm 106, a short lean arm 108, suspension arms 110, a first segment 112, a second segment 114, an uppermost edge 116, a free end 118, an obtuse angle 120, a lower end 122, a distal end 124, and a plurality of legs 126 according to one embodiment.

The soap holding apparatus 100 may comprise an arrangement of various components that may be designed to hold a soap bar while allowing air circulation for drying, according to one embodiment. The vertical post 102 may be a central upright structural component that may provide the support structure for the soap holding apparatus 100. The vertical post 102 may be made of materials including but not limited to, stainless steel, aluminum, plastic, and/or composite materials. The vertical post 102 may be connected to the base 104.

The vertical post 102 may be extended vertically from the base 104 and may comprise the uppermost edge 116 and the free end 118. The vertical post 102 may extend upwards at 90 degrees from the base 104 and/or at any other varying angles to adjust for balanced weight distribution, balancing of soap bar, and/or optimal drying of soap bar The vertical post 102 may attach with and/or be integral with the long lean arm 106, short lean arm 108, and/or suspension arms 110, each of which may be affixed at various positions along the vertical post 102 to hold the various soap bars, according to one embodiment. The vertical post 102 may be attached to the base 104 by various means including but not limited to, screws, bolts, adhesive bonding, snap-fit attachment, interlocking grooves, and/or welded joints. The vertical post 102 and the base 104 may be made into a single molded piece and/or may eliminate the need for any additional attachment means.

The central positioning of vertical post 102 may allow the vertical post 102 to uniformly distribute the weight and/or force applied by the soap bar. The base 104 may be the foundation of the soap holding apparatus 100. The base 104 may provide stability and/or support for the soap holding apparatus 100. The base 104 may be of various designs and/or shapes including but not limited to a plurality of legs 126, star-shape, square, rectangle, and/or flat and/or oval-shaped to function as both the base 104 and/or a drip tray 306. The base 104 may prevent the soap holding apparatus 100 from tipping over. The base 104 may be made from various materials including but not limited to plastic, stainless steel, aluminum, bamboo, wood, ceramic, and/or composite materials.

The long lean arm 106 may be a support arm that may be affixed to the vertical post 102. and The long lean arm 106 may comprise an end that extends substantially horizontally outward to support the upper part of a bar of soap when the soap is resting on the suspension arms 110, according to one embodiment. The long lean arm 106 may be connected to the vertical post 102 at a variable height below the uppermost edge 116 and/or above the short lean arm 108. The long lean arm 106 may comprise a length between 0.5 inches and 1.25 inches to accommodate. The long lean arm 106 may be attached to the vertical post 102 using various means including but not limited to a socket joint, adhesive bonding, a snap-fit attachment, and/or molded as a single piece with the vertical post 102, according to one embodiment. The long lean arm 106 may be made from various materials including but not limited to plastic, stainless steel, aluminum, bamboo, wood, ceramic, and/or composite materials.

The short lean arm 108 may be a support arm that may be laterally affixed to the vertical post 102. The short lean arm 108 may be connected to the vertical post 102 at a variable height below the long lean arm 106 and/or above the suspension arms 110. The short lean arm 108 may comprise a length between 0.25 inches and 1.00 inches to accommodate and/or support a bar of soap. The short lean arm 108 may be attached to the vertical post 102 using various means including but not limited to a socket joint, adhesive bonding, a snap-fit attachment, and/or molded as a single piece with the vertical post 102. The short lean arm 108 may be shorter in length than the long lean arm 106. The short lean arm 108 may be made from various materials including but not limited to plastic, stainless steel, aluminum, bamboo, wood, ceramic, and/or composite materials.

The suspension arms 110 may comprise a pair of elongated members which may be connected to the vertical post 102. The suspension arms 110 may include a first segment 112, a second segment 114, an obtuse angle 120, and a distal end 122. The suspension arms 110 may attach to the vertical post 102 at a variable height below the short lean arm 108 and/or above the base 104.

The suspension arms 110 may have a length between 1.75 inches and 2.75 inches to accommodate various soap shapes and/or sizes, including but not limited to large bar soap, medium bar soap, and/or small bar soap. The suspension arms 110 may be constructed from various materials, including but not limited to plastic, stainless steel, aluminum, bamboo, wood, ceramic, and/or composite materials. The suspension arms 110 may comprise a roughed and/or tacky surface to further prevent a bar of soap from slipping off of the suspension arms 110.

The suspension arms 110 may be attached to the vertical post 102 substantially adjacent to one another, forming an acute angle between them. This acute angle, or the space between the suspension arms 110, may align with the long lean arm 106 and/or the short lean arm 108, which may ensure that all these components are positioned within the same plane. The long lean arm 106 may extend laterally from the vertical post 102 above the short lean arm 108, while the short lean arm 108 may extend above the suspension arms 110. The spatial configuration of the suspension arms 110 may provide stable support for various soap bars, where the alignment between the long lean arm 106, short lean arm 108, and the angle or space between the suspension arms 110 may ensure that the soap remains secure while being easily accessible.

Each suspension arm 110 may include a first segment 112 and/or a second segment 114. The first segment 112 may be a horizontal segment that may extend from the vertical post 102. The first segment 112 may provide a stable horizontal base to cradle the soap bar. The first segment 112 may comprise a length between 1.00 inches and 1.75 inches. The first segment 112 may be attached to the vertical post 102 using various means including but not limited to, a socket joint, molded as a single piece with the vertical post 102 and second segment 114, a screw, a bolt, and/or an adhesive bonding, according to one embodiment.

The second segment 114 may extend from the distal end 124 of the first segment 112. The angle, surface contact, and/or upward bent of the second segment 114 may keep the soap bar in place. The upward orientation of the second segment 114 from the first segment 112 may assist the soap bar to remain positioned and/or rest on the suspension arms 110. The second segment 114 may be angled upwards at the obtuse angle 120 ranging between 130 degrees and 180 degrees to create a barrier that may prevent the soap bar from falling and/or slipping off of the suspension arms 110.

The first segment 112 and second segment 114 may be connected at the obtuse angle 120 and/or the distal end 124 using various means including but not limited to a hinge attachment, an adhesive bonding, a welded joint, and/or molded as a single piece. The connection may ensure both the first segment 112 and the second segment 114 maintain structural integrity to support the soap bar in place, according to one embodiment.

The uppermost edge 116 may be the top edge and/or boundary of the vertical post 102. The height of the uppermost edge 116 may provide variable space for the long lean arm 106 to accommodate various attachments including but not limited to adjustable brackets, hooks, and/or additional support arms.

The free end 118 may be a terminal and/or end of the vertical post 102 which may be unattached to any other structure. The free end 118 may allow unobstructed air circulation around the bar of soap.

The obtuse angle 120 may be the angle formed between the first segment 112 and the second segment 114 of the suspension arms 110. The obtuse angle 120 may range between 130 degrees and 180 degrees to hold a soap bar in place, which may prevent the soap bar from slipping off, and/or allow drainage of excess water. The lower end 122 may be the bottom portion of the vertical post 102 where the vertical post 102 may be connected to the base 104. The lower end 122 may be connected to the base 104 via one or more of a snap-fit mechanism, socket joint, adhesive bonding, threaded connection, welded joint, and/or molded as a single piece.

The distal end 124 may be the terminal end of the first segment 112 of the suspension arms 110. The distal end 124 may form the part of the structure that may form the obtuse angle 120. The connection between the first segment 112 and the second segment 114 at the distal end 124 may be attached via one or more of a socket joint, adhesive bonding, threaded connection, welded joint, and/or molded as a single piece.

The plurality of legs 126 may be one or more legs extending outward from the lower end 122 of the vertical post 102. The plurality of legs 126 of the base 104 may provide support and/or stability to the soap holding apparatus 100. The plurality of legs 126 may distribute the weight of the soap holding apparatus 100 uniformly. The plurality of legs 126 may be connected to the lower end 122 of the vertical post 102 via one or more of an adhesive bonding, threaded connection, welded joint, and/or molded as a single piece. The plurality of legs 126 may be made of various materials including but not limited to plastic, stainless steel, aluminum, bamboo, wood, ceramic, and/or composite materials.

According to one or more embodiments, FIG. 1 shows a soap holding apparatus 100 that may comprise a vertical post 102 that may extend upward from a base 104. The vertical post 102 may be attached to the base via one or more of a snap-fit mechanism, socket joint, adhesive bonding, threaded connection, welded joint, and/or molded as a single piece. The base 104 may comprise a plurality of legs 126 extending outwardly from a lower end 122 of the vertical post 102 to support the soap holding apparatus 100 when in a standing position. The vertical post 102 may attach to the base 104 at a center of the base 104 and/or where the plurality of legs 126 cross. The vertical post 102 and the base 104 may be substantially perpendicular to one another.

The vertical post 102 may comprise a free end 118 at an uppermost edge 116. The soap holding apparatus 100 may further comprise a plurality of suspension arms 110 affixed laterally on the vertical post 102 to hold a bar of soap. The plurality of suspension arms 110 may be attached to the vertical post 102 via one or more of a snap-fit mechanism, socket joint, adhesive bonding, threaded connection, welded joint, and/or molded as a single piece. The plurality of suspension arms 110 may be attached to the vertical post 102 above the lower end 122 and below at least one of the long lean arm 106 and the short lean arm 108, according to one embodiment, Each of the plurality of the suspension arms 110 may be divided into two segments. Each of the plurality of suspension arms 110 may comprise a first segment 112 that laterally affixes each of the plurality of suspension arms 110 to the vertical post 102. Each of the plurality of suspension arms 110 may further comprise a second segment 114 that may extend from the distal end 122 of the first segment 112 at an obtuse angle 120.

The second segment 114 that may extend from the distal end 122 of the first segment 112 may create the obtuse angle 120. The obtuse angle 120 may range between 130 degrees and 180 degrees and may support the bar of soap and/or prevent the bar of soap from slippage. The soap holding apparatus 100 may further comprise a short lean arm 108 that may be laterally affixed to the vertical post 102 above the suspension arms 110 to support the bar of soap. The soap holding apparatus 100 may further comprise a long lean arm 106 laterally affixed to the vertical post 102 above the short lean arm 108 to support the bar of soap. The soap holding apparatus 100 and its various components may be made from including but not limited to, at least one of plastic, stainless steel, aluminum, titanium, wood, and/or ceramic material.

Figure 2:
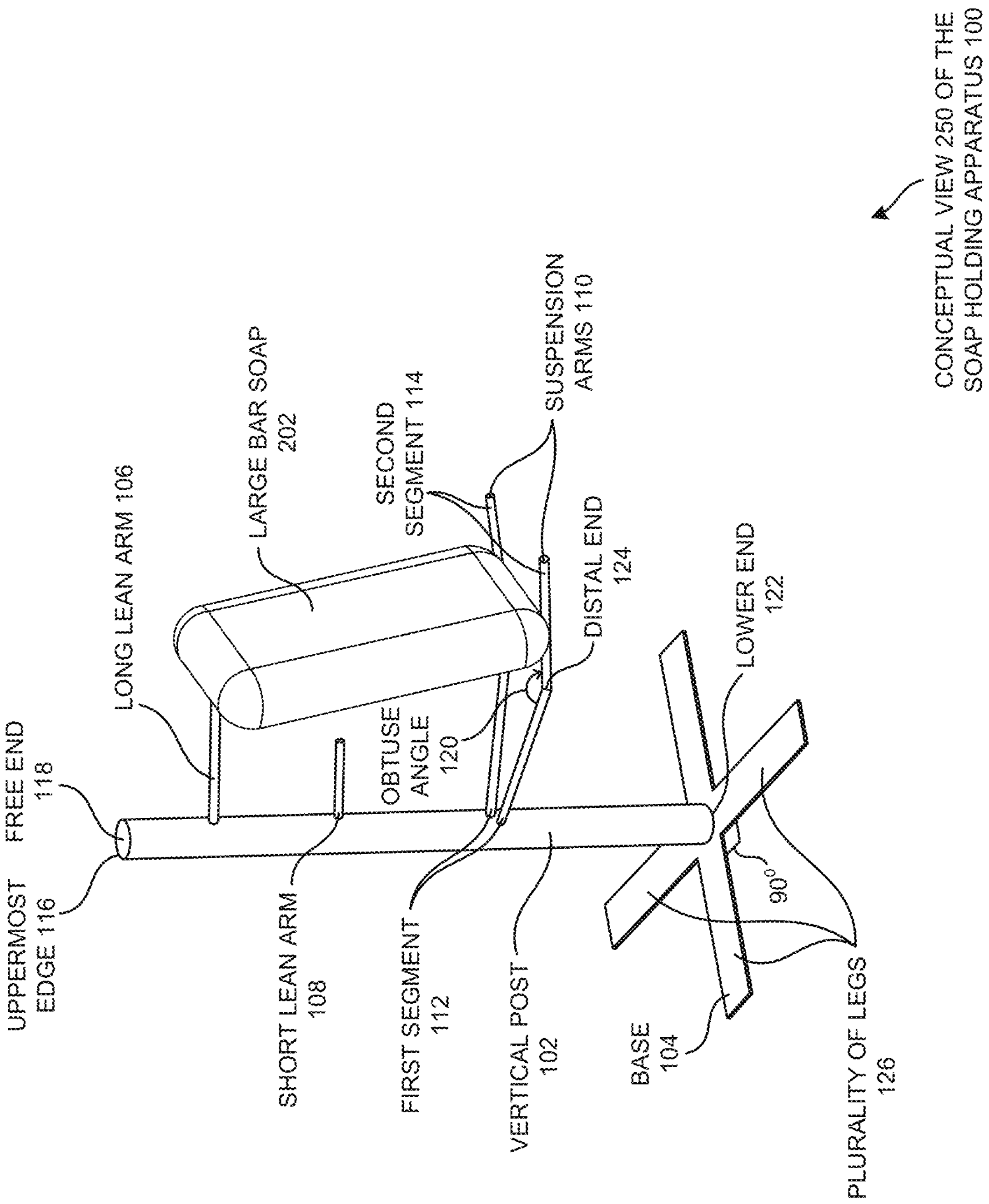
FIG. 2 is a conceptual view of the soap holding apparatus of FIG. 1 illustrating a large bar of soap placed on suspension arms with the top of the soap leaning against the long lean arm, according to one or more embodiments.

FIG. 2 is a conceptual view 250 of the soap holding apparatus 100 of FIG. 1, according to one embodiment. FIG. 2 illustrates the vertical post 102, the base 104, the long lean arm 106, the short lean arm 108, the suspension arms 110, the first segment 112, the second segment 114, the uppermost edge 116, the free end 118, the obtuse angle 120, the lower end 122, the distal end 124, the plurality of legs 126, and a large bar soap 202.

The large bar soap 202 may be a large block of the cleansing agent that may be composed of a mixture of natural and/or synthetic fats and/or alkalis. The large bar soap 202 may be used for personal hygiene, cleaning purposes, and/or various applications including but not limited to removing dirt, grease, and/or microbes. The large bar soap 202 may be supported by the first segment 112, the second segment 114, and/or the obtuse angle 120 of the suspension arms 110. The large bar soap 202 may lean against the long lean arm 106.

The long lean arm 106 may provide support to the large bar soap 202. By positioning the large bar soap 202 against the long lean arm 106 the soap bar may be kept stable and/or elevated for efficient drying. The long lean arm 106 may prevent the large bar soap 202 from tipping over and/or falling off the soap holding apparatus 100. The elevated position of the large soap bar 202 may ensure the large bar soap 202 does not sit in residual water which may prevent the large bar soap 202 from becoming soggy and/or dissolving prematurely.

The first segment 112 of the suspension arms 110 may hold the lower part of the large bar soap 202. The first segment 112 of the suspension arms 110 may allow any excess water to drain off from the large bar soap 202. The second segment 114 may be connected to the first segment 112 of the suspension arms 110. The second segment 114 may prevent the large bar soap 202 from slipping off the soap holding apparatus 100. The obtuse angle 120 between 130 degrees and 180 degrees from the distal end 122 of the first segment 112 may function as a barrier that may prevent the large bar soap 202 from dislodging in conditions including but not limited to wetness and/or slipperiness.

Figure 3:
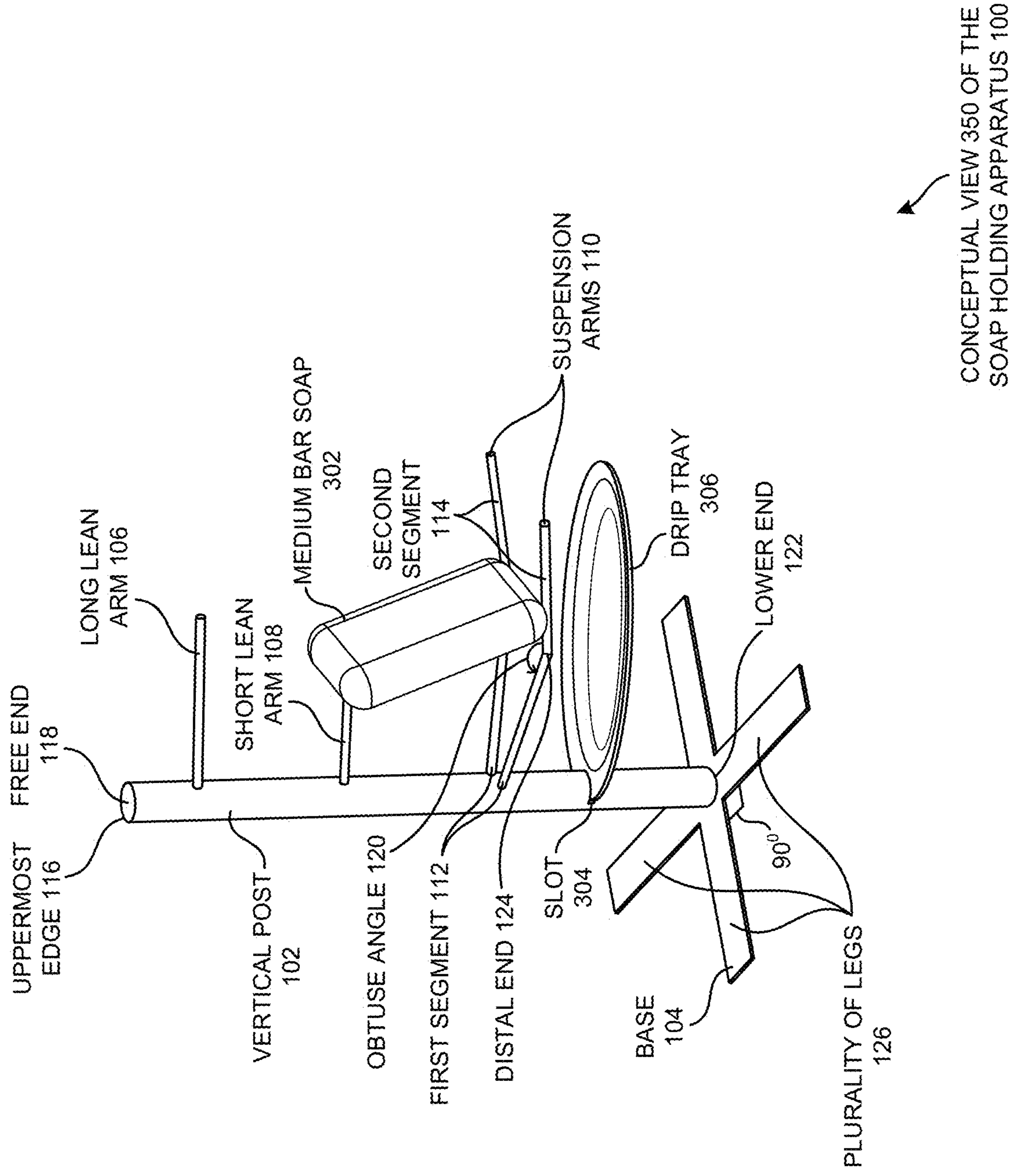
FIG. 3 is another conceptual view of the soap holding apparatus FIG. 1 illustrating the method of holding a medium bar of soap placed on suspension arms with the top of the soap leaning against the short lean arm, according to one or more embodiments.

FIG. 3 is a conceptual view 350 of the soap holding apparatus 100 of FIG. 1, according to one embodiment. FIG. 3 illustrates the vertical post 102, the base 104, the long lean arm 106, the short lean arm 108, the suspension arms 110, the first segment 112, the second segment 114, the uppermost edge 116, the free end 118, the obtuse angle 120, the lower end 122, the distal end 124, the plurality of legs 126, a medium bar soap 302, a slot 304, and/or a drip tray 306.

The medium bar soap 302 may be a medium block of the cleansing agent that may be composed of a mixture of natural and/or synthetic fats and/or alkalis. The medium bar soap 302 may be used for personal hygiene, cleaning purposes, and/or various applications including but not limited to removing dirt, grease, and/or microbes. The medium bar soap 302 may be derived from the large bar soap 202 through reduction in size. The medium bar soap 302 may be supported by the first segment 112, the second segment 114, and/or the obtuse angle 120 of the suspension arms 110. The medium bar soap 302 may lean against the short lean arm 108. The medium bar soap 302 may lean against the short lean arm 108 which may allow drying and/or prevent water accumulation. The short lean arm 108 may prevent the medium bar soap 302 from tipping over and/or falling off the soap holding apparatus 100.

The first segment 112, the second segment 114, and/or the obtuse angle 120 of the suspension arms 110 may support the medium bar soap 302. The first segment 112 of the suspension arms 110 may allow any excess water to drain off from the medium bar soap 302. The obtuse angle 120 between 130 degrees and 180 degrees from the distal end 122 of the first segment 112 may function as a barrier that may prevent the medium bar soap 302 from dislodging in conditions including but not limited to wetness and/or slipperiness. The soap holding apparatus 100 may comprise the slot 304. The slot 304 may be a narrow opening and/or groove where the drip tray 306 may be held and/or attached in place. The slot 304 may be located on the vertical post 102 below the suspension arms 110.

The soap holding apparatus 100 may further comprise a drip tray 306 that may be laterally affixed to a slot 304 on the vertical post 102 below the plurality of suspension arms 110. The drip tray 306 may be a container, a dish, and/or a flat surface. The drip tray 306 may be removably attached to the slot 304 on the vertical post 102 below the suspension arms 110. The drip tray 306 may be of any shape. The drip tray 306 may collect water dripping from the bar of soap when the bar of soap is held by the plurality of suspension arms 110. The drip tray 306 may be slightly concave and/or may include raised edges to prevent water from spilling over onto the surface The drip tray 306 may be attached to the vertical post 102 via the slot 304 above the lower end 122 of the vertical post 102. The drip tray 306 may be the base for the soap holding apparatus 100. The drip tray 306 may be attached and/or detached to the vertical post 102 by various means including but not limited to a slide-in attachment, snap-on attachment, magnetic attachment, bracket or hook attachment, and/or twist-lock attachment.

The drip tray 306 may be used to catch any water spills and/or soap bar residue that may drip from a soap bar while the soap bar is drying on the soap holding apparatus 100. The drip tray 306 may keep the area around the soap bar clean and dry and may prevent the water from accumulating on surfaces and/or causing mess and/or damage, according to one embodiment. The drip tray 306 may measure between 1.75 inches and 2.75 inches long and/or 1.75 inches and 2.50 inches wide. The drip tray 306 may be removed for cleaning to maintain hygiene.

According to one or more embodiments, FIG. 3, shows the soap holding apparatus 100 that may further comprise a drip tray 306 that may be laterally affixed to a slot 304 on the vertical post 102 below the plurality of suspension arms 110. The drip tray 306 may collect water dripping from the bar of soap when the bar of soap is held by the plurality of suspension arms 110. The drip tray 306 may be removably attached to the slot 304 on the vertical post 102 below the suspension arms 110.

The drip tray 306 may be attached to the vertical post 102 below a lower end 122 of the vertical post 102. The drip tray 306 may be the base for the soap holding apparatus 100. The drip tray 306 may collect water dripping from the bar of soap when the bar of soap is held by the plurality of suspension arms 110.

Figure 4:
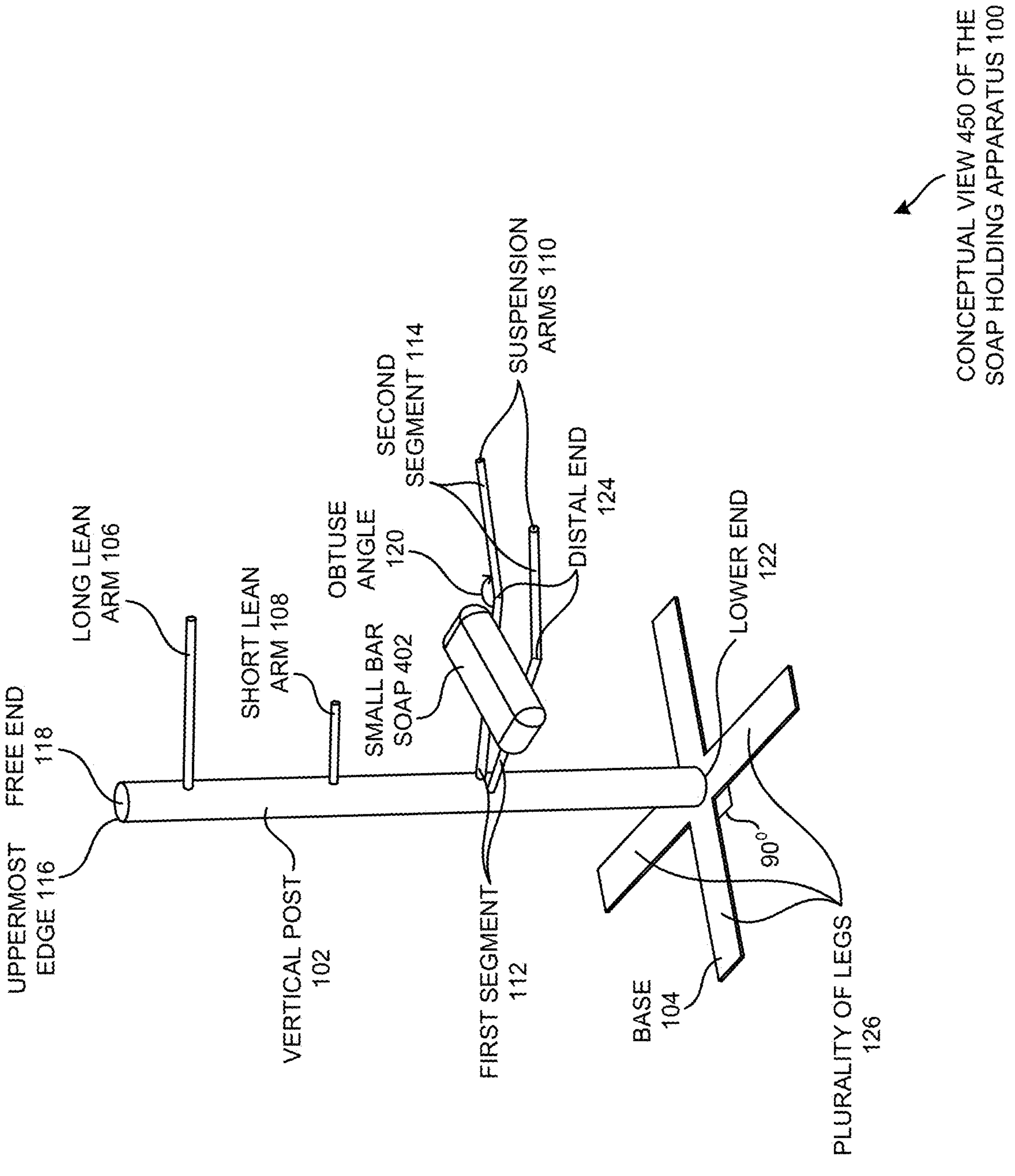
FIG. 4 is a conceptual view of the soap holding apparatus FIG. 1 illustrating a small bar of soap placed on the suspension arms, according to one or more embodiments.

FIG. 4 is a conceptual view 450 of the soap holding apparatus 100 of FIG. 1 illustrating a small bar soap 402 placed on the first segment 112 of the suspension arms 110, according to one or more embodiments. FIG. 4 illustrates the vertical post 102, the base 104, the long lean arm 106, the short lean arm 108, the suspension arms 110, the first segment 112, the second segment 114, the uppermost edge 116, the free end 118, the obtuse angle 120, the lower end 122, the distal end 124, the plurality of legs 126, and a small bar soap 402.

The small bar soap 402 may be a compact solid cleansing agent that may be smaller in size and/or weight. The small bar soap 402 may be utilized for including but not limited to, personal hygiene, cleansing application, and/or travel purposes. The small bar soap 402 may exhibit diminished size due to prior use. The small bar soap 402 may be placed on the first segment 112 of the suspension arms 110 in a resting state.

The first segment 112, the second segment 114, and/or the obtuse angle 120 of the suspension arms 110 may hold the small soap bar 402 in a resting state. The first segment 112, the second segment 114, and/or the obtuse angle 120 of the suspension arms 110 may support and/or may provide stable minimal surface contact to enhance the drying of the small soap bar 402. The minimal surface area may reduce the contact points of the small soap bar 402 to the suspension arms 110. The minimal surface contact may allow air to circulate freely around the small bar soap 402 which may provide effective drying. The reduced contact points may prevent the small bar soap 402 from including but not limited to, becoming soggy, reduce the contamination risks, and/or limit the area where residue and/or moisture may accumulate.

The second segment 114 may provide physical support that may secure the small bar soap 402 in place above a surface to encourage optimal drying. The second segment 114 may prevent the small bar 402 of soap from slipping off the soap holding apparatus 100. The obtuse angle between 130 degrees and 180 degrees from the distal end 122 of the first segment 112 may function as a barrier that may prevent the small bar soap 402 from dislodging in conditions including but not limited to wetness and/or slipperiness. The second segment 114 may restrain and/or maintain the small bar soap 402 position on the first segment 112.

FIGS. 5A-5B are an apparatus view 550 of a wall-mounted soap holding apparatus 500, according to one embodiment. FIGS. 5A-5B illustrate the vertical post 102, the long lean arm 106, the short lean arm 108, the suspension arms 110, the first segment 112, the second segment 114, the uppermost edge 116, the free end 118, the obtuse angle 120, the distal end 124, the slot 304, the drip tray 306, a horizontal arm 502, an edge 504 (of the horizontal arm 502), a bracket 506, a suction cup(s) 508, a hole 510, a center 512 (of the bracket 506), and a distal end 514, according to one embodiment.

The wall-mounted soap holding apparatus 500 may comprise an arrangement of various components that may be designed to keep a soap bar elevated and away from surfaces that may collect water and/or dirt to reduce the chance of bacterial growth, according to one embodiment. The wall-mounted soap holding apparatus 500 may be designed with minimal contact points on the soap bar to prevent the soap bar from sticking, have less surface area for dirt, prevent bacteria accumulation, and/or reduce soap residue build-up. The wall-mounted soap holding apparatus 500 may allow for increased air circulation around the soap bar and may help the soap bar dry faster and stay firm and/or undegraded.

The wall-mounted soap apparatus 500 may be affixed on a surface by various means including but not limited to the suction cup(s) 508, screws, magnets, double-sided tape, and/or glue. The wall-mounted soap holding apparatus 500 may be constructed from materials including but not limited to, wood, plastic, ceramics, aluminum, titanium, and/or stainless steel and may ensure long-lasting performance even in moist and/or humid environments including but not limited to bathrooms and/or kitchens.

Figure 5:
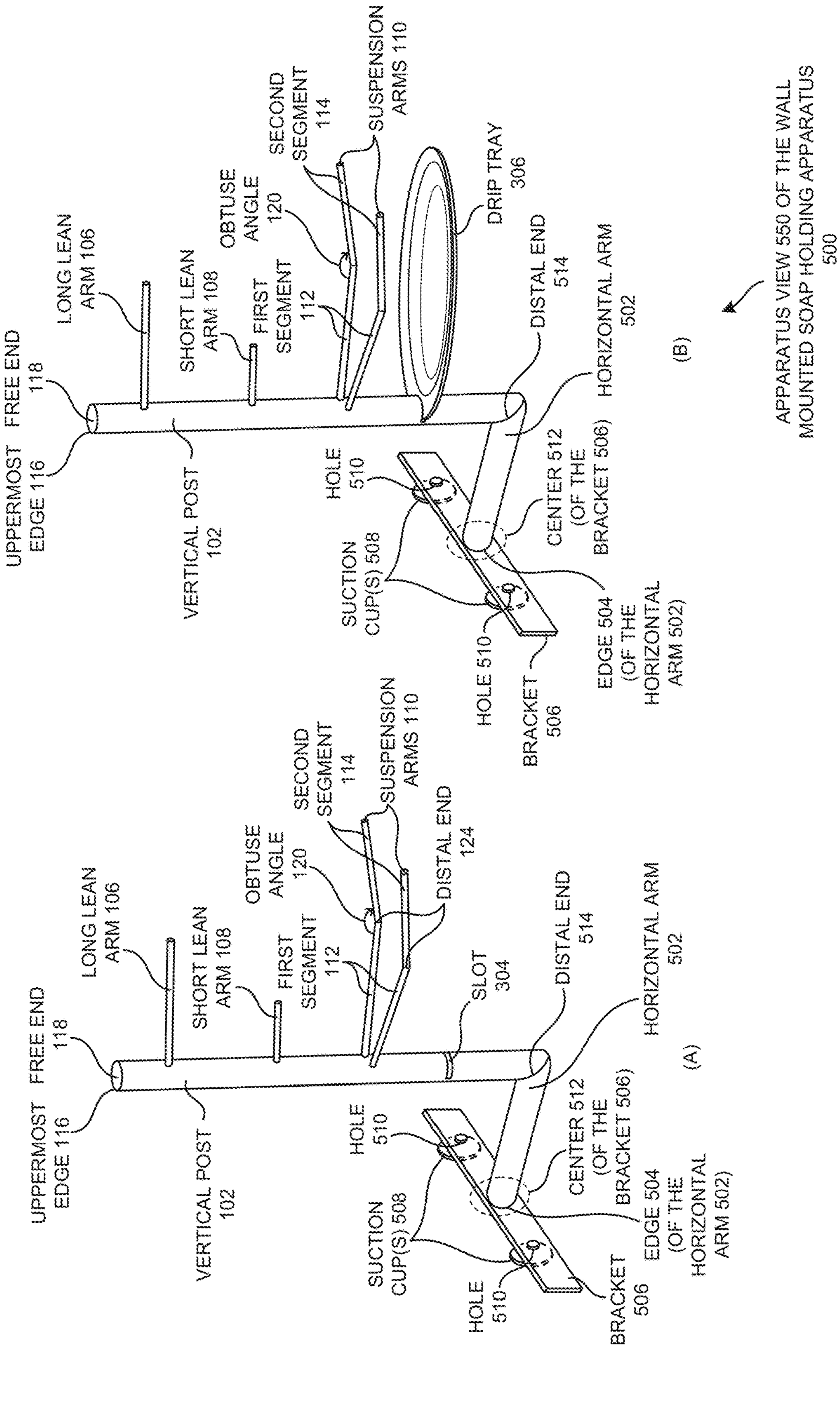
FIG. 5 is an apparatus view of a wall mounted soap holding apparatus illustrating the constituting components forming the wall mounted soap holding apparatus, according to one or more embodiments.

According to one or more embodiments, FIG. 5 (A) shows the wall-mounted soap holding apparatus 500 comprising the slot 304 with the option of attaching a drip tray 306 into the slot 304. In FIG. 5 (A), the wall-mounted soap holding apparatus 500 comprises the horizontal arm 502, according to one or more embodiment. The horizontal arm 502 may be attached to a center 512 of the bracket 506 to affix the wall-mounted soap holding apparatus 500 to the surface. The surface may be wall surface and/or countertop surface where the apparatus may be mounted and/or placed. The surface may include various surfaces including but not limited to, bathroom tiles, kitchen tiles, painted walls, mirrors, and/or shower walls. The horizontal arm 502 may be affixed to the center 512 of the bracket 506 using various means including but not limited to, one or more screws, snap-fit attachment, detent, and groove attachment, rotational locking attachment, magnetic attachment, threaded connection, and/or welded joints. The horizontal arm 502 may allow the wall-mounted soap holding apparatus 500 to extend outward from the surface which may create a convenient and/or accessible spot for placing one or more soap bars.

The vertical post 102 may extend upward between 70 degrees and 120 degrees angles from the distal end 514 of the horizontal arm 502. The vertical post 102 may be attached to the distal end 514 of the horizontal arm 502 using various means including but not limited to, threaded connection, snap-fit attachment, adhesive bonding, bracket or clamp, single mold, and/or welding.

The vertical post 102 may comprise the slot 304 located below the suspension arms 110, according to one embodiment. The slot 304 of the vertical post 102 of the wall-mounted soap holding apparatus 500 may be a narrow opening and/or groove where the drip tray 306 may be connected and/or detached. The absence of the drip 306 tray may allow any water and/or soap residue on the soap bar to drip directly downward.

The wall-mounted soap holding apparatus 500 may comprise the bracket 506. The bracket 506 may be attached to the horizontal post 502 using various fastening means including but not limited to screws and bolts, welded joint, adhesive bonding, single mold, interlocking, and/or clamp or collar to ensure stability and/or durability. The bracket 506 may comprise a length between 1.00 inches and 2.00 inches long. The bracket 506 may be affixed to the surface by at least one of screws, the suction cup(s) 508, bolts, one or more magnets, double-sided tape, and/or glue.

The bracket 506 may comprise the suction cup(s) 508. The suction cup(s) 508 may be a fixture that may use the force of suction to stick and/or adhere to smooth and/or solid surfaces. The suction cup(s) 508 may work by pressing the suction cup(s) 508 against the surface, pushing out the air, and may create a partial vacuum. This vacuum may hold the suction cup(s) 508 in place due to the pressure pushing against the suction cup(s) 508 from the outside. The suction cup(s) 508 may be attached to the rear side of the bracket 506 by fitting into one or more pre-drilled holes 510 and/or slots designed to hold the suction cup(s) 508 firmly in place.

The suction cup(s) 508 may include a stem and/or a knob that may fit snugly into the holes to ensure the suction cup(s) 508 stays in place. The suction cup(s) 508 may be glued and/or snapped into position with the one or more holes 510, which may depend on the design of the bracket 506. The suction cup(s) 508 may be made from materials including but not limited to rubber and/or plastic. The hole 510 may be a circular opening located on the bracket 506 which may be used to mount and/or secure the wall-mounted soap holding apparatus 500. The hole 510 may serve various functions including but not limited to accommodating fasteners, screws, bolts, and/or suction cup(s) 508 which may attach the bracket to the wall and/or other surfaces. The hole 510 may allow for alignment and/or positioning adjustment during the installation of the wall-mounted soap holding apparatus 500.

According to one or more embodiments, FIG. 5B shows the wall-mounted soap holding apparatus 500 with the drip tray 306 laterally affixed to the slot 304. The drip tray 306 may be attached to the slot 304 on the vertical post 102 below the suspension arms 110. The drip tray 306 may be a container, a dish, and/or a flat surface. The drip tray 306 may be detachable. The drip tray 306 may be attached and/or detached to the vertical post 102 by various means including but not limited to a slide-in attachment, snap-on attachment, magnetic attachment, bracket or hook attachment, and/or twist-lock attachment.

The drip tray 306 may be used to catch any water spills and/or soap bar residue that may drip from a soap bar while the soap bar is drying and resting on the suspension arms 110 of the wall-mounted soap holding apparatus 500. The drip tray 306 may keep the area around the soap bar clean and dry and may prevent the water from accumulating on surfaces and/or causing mess and/or damage, according to one embodiment. The drip tray 306 may measure between 1.75 inches and 2.75 inches long and/or 1.75 inches and 2.50 inches wide. The drip tray 306 may be removed for cleaning to maintain hygiene.

According to one or more embodiments, FIG. 5B shows the soap holding apparatus 500 which may comprise a horizontal arm 502 extending outward from a center 512 of a bracket 506. The bracket 506 may be attached to an edge 504 of the horizontal arm 502 to affix the soap holding apparatus 500 to a surface, according to one embodiment. The bracket 506 may comprise one or more holes 510 to allow insertion of at least one of the screws (not shown), bolts (not shown), and/or one or more suction cup(s) 508 to allow the soap holding apparatus 500 to be affixed to a surface. The bracket 506 may be affixed to the surface by at least one of the screws, the suction cup(s) 508, and the bolts.

The soap holding apparatus 500 of FIG. 5B may further comprise a vertical post 102 that may extend upward from the distal end 124 of the horizontal arm 502. The soap holding apparatus 500 may further comprise a plurality of suspension arms 110 affixed laterally to the vertical post 102 to hold a bar of soap. Each of the plurality of the suspension arms 110 may be divided into two segments. Each of the plurality of suspension arms 110 may comprise a first segment 112 laterally affixed to the vertical post 102. Each of the plurality of suspension arms 110 may comprise a second segment 114 that may extend from the distal end 124 of the first segment 112 at the obtuse angle 120. The second segment 114, which may extend from the distal end 124 of the first segment 112, creates the obtuse angle 120. The obtuse angle 120 may range between 130-degrees and 180-degrees and may support the bar of soap and/or prevent the bar of soap from slippage. The soap holding apparatus 500 may further comprise a short lean arm 108 that may be laterally affixed to the vertical post 102 above the plurality of suspension arms 110 to support the bar of soap, according to one embodiment. The soap holding apparatus 500 may further comprise a long lean arm 106 that may be laterally affixed to the vertical post 102 above the short lean arm 108 to support the bar of soap, according to one embodiment.

The soap holding apparatus 500 may further comprise a drip tray 306 that may be laterally affixed to a slot 304 on the vertical post 102 below the plurality of suspension arms 110. The drip tray 306 may be removably attached to the slot 304 on the vertical post 102 below the suspension arms 110. The drip tray 306 may collect water dripping from the bar of soap when the bar of soap is held at least partially by the plurality of suspension arms 110.

Figure 6:
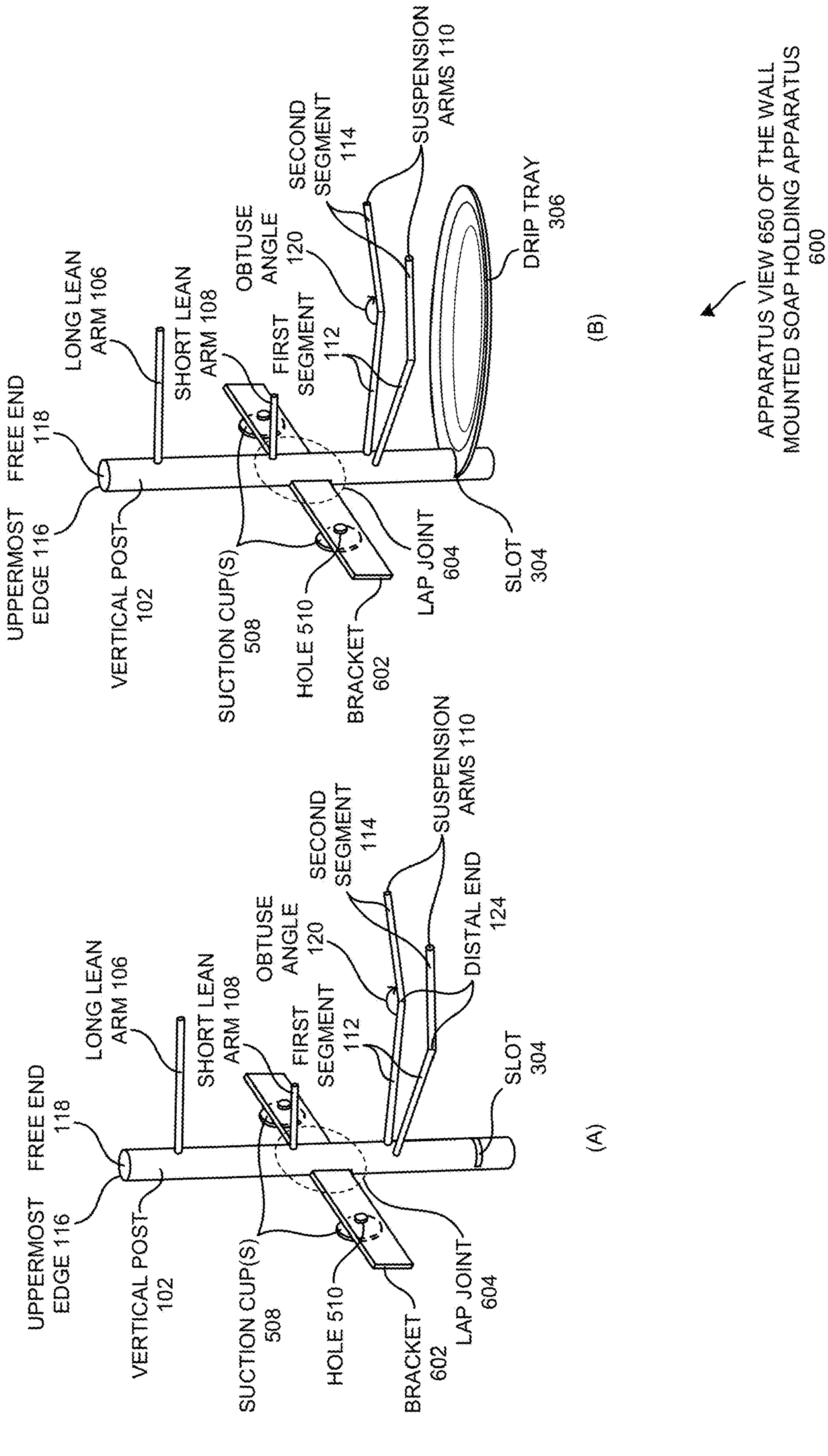
FIG. 6 is an apparatus view of forming the wall-mounted soap holding apparatus of FIG. 5 to mount on the vertical surface, according to one or more embodiments.

FIGS. 6A-6B are an apparatus view 650 of the wall mounted soap holding apparatus 600, according to one embodiment. FIGS. 6A-6B illustrate the soap holding apparatus 600 comprising the vertical post 102, the long lean arm 106, the short lean arm 108, the suspension arms 110, the first segment 112, the second segment 114, the uppermost edge 116, the free end 118, the obtuse angle 120, the distal end 124, the slot 304, the drip tray 306, the suction cup(s) 508, the hole 510, a bracket 602, and a lap joint 604, according to one or more embodiment.

The wall-mounted soap holding apparatus 600 may comprise the bracket 602. The bracket 602 may be designed to firmly attach to various surfaces including but not limited to, bathroom tiles, kitchen tiles, painted walls, mirrors, and/or shower walls. The bracket 602 may provide a stable foundation for the wall-mounted soap holding apparatus 600 to ensure the wall-mounted soap holding apparatus 600 remains firmly in place. The bracket 602 may be mounted on the wall by various means including but not limited to the suction cup(s) 508, screws, magnets, double-sided tape, and/or glue. The bracket 602 may comprise a length between 1.00 inches and 4.00 inches.

The wall-mounted soap holding apparatus 600 may comprise the lap joint 604. The lap joint 604 may be where the bracket 602 and the vertical post 102 of the wall-mounted soap holding apparatus 600 overlap each other. The lap joint 604 may include cutouts and/or notches on the bracket 602 and the vertical post 102 that fit together tightly which may create a strong connection and may allow the bracket 602 and the vertical post 102 to interlock. The lap joint 604 may be reinforced by various means including but not limited to, screws, glue, wooden pins, metal brackets or straps, welding or brazing, and/or rivets. The materials used in the lap joint 604 may resist corrosion and/or wear, which may ensure the longevity of the connection of the lap joint 604 between the bracket 602 and the vertical post 102 of the wall-mounted soap holding apparatus 600 despite frequent use and/or exposure to water.

According to one or more embodiments, FIG. 6A illustrates the attachment of the components of the wall mounted soap holding apparatus 600, according to one embodiment. The bracket 602 may connect the vertical post 102 to the surface and/or wall via the lap joint 604. The bracket 602 may comprise the suction cup(s) 508 and/or slots 304 that may allow secure attachment to various vertical surfaces including but not limited to the bathroom, shower wall, painted walls, mirrors, and/or kitchen tiles. The vertical post 102 and the bracket 602 may overlap at the lap joint 604 to connect and/or affix the vertical post 102 to the bracket 602.

The vertical 102 may be connected to the bracket 602 at the lap joint 604 using various means including but not limited to adhesive bonding, a snap-fit attachment, a welded joint, and/or molded as a single piece. The lap joint 604 may be reinforced using various means including but not limited to screw, glue, and/or the suction cup(s) 508.

According to one or more embodiments, FIG. 6B illustrates the attachment of the drip tray 306 to the slot 304 of the vertical post 102 of the wall mounted soap holding apparatus 600. The drip tray 306 may be positioned below the suspension arms 110 to catch any excess water that may drip from the soap bar. The drip tray 306 may be attached to the slot 304 of the vertical post 102 using various means including but not limited to a snap-fit connection, slide-in attachment, hook and lock attachment, and/or adhesive bonding. The wall-mounted soap holding apparatus 600 may keep the soap bar secure and/or may allow the drip tray 306 to catch any excess water that may drip from the soap bar and/or maintain a clean and/or dry environment.

According to one or more embodiments, FIG. 6B shows a wall mounted soap holding apparatus 600 that may comprise a vertical post 102 that may be mounted on a surface in an upright position. The soap holding apparatus 600 may comprise the drip tray 306 that may be laterally affixed to a slot 304 on the vertical post 102 below the plurality of suspension arms 110. The drip tray 306 may collect water dripping from the bar of soap when the bar of soap is held by the plurality of suspension arms 110. The drip tray 306 may be removably attached to the slot 304 on the vertical post 102 below the suspension arms 110.

Figure 7:
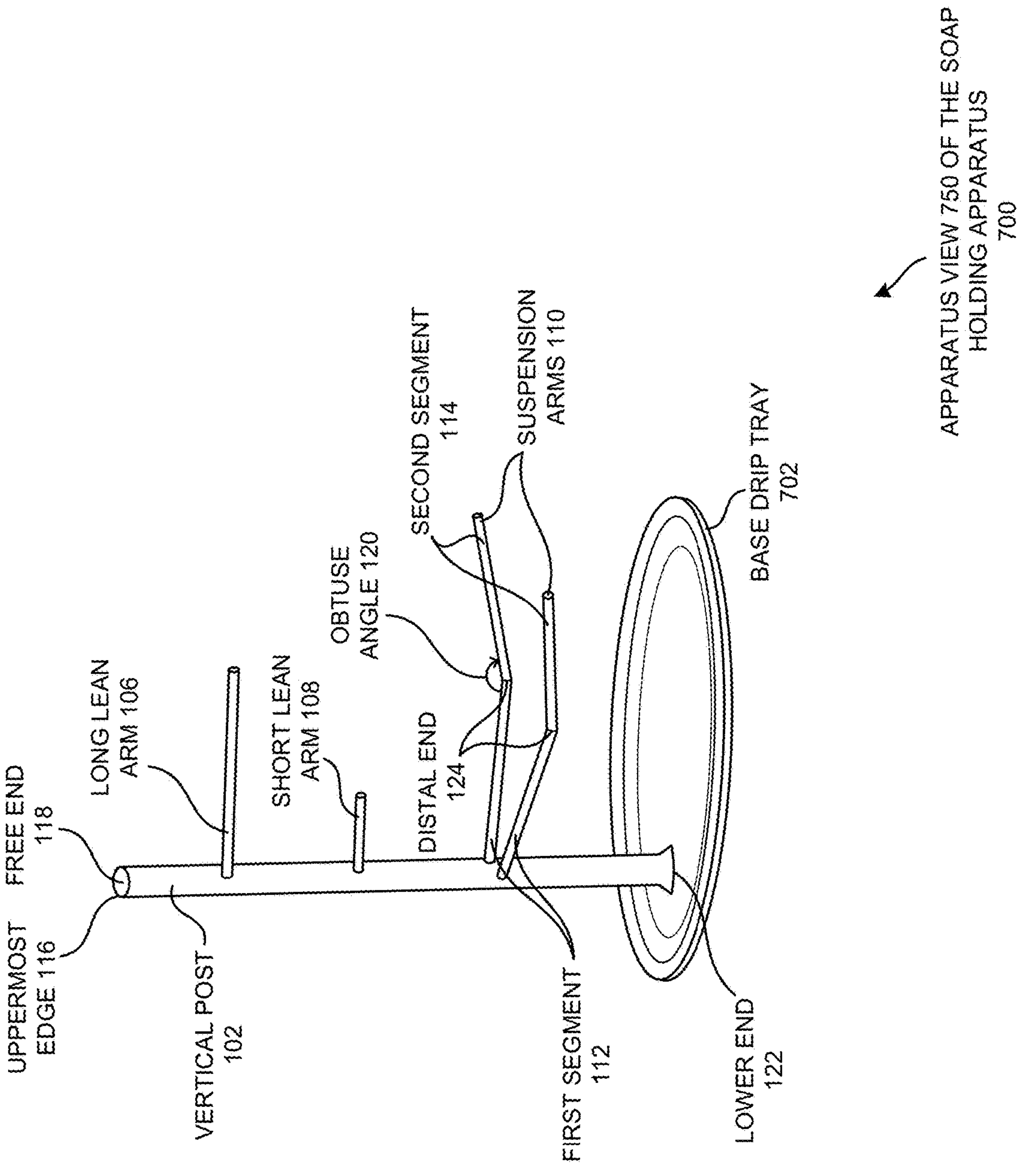
FIG. 7 is an apparatus view of the soap holding apparatus of FIG. 1 illustrating the drip tray attached to the lower end of the vertical post to serve as a base, according to one or more embodiments.

FIG. 7 is an apparatus view 750 of a soap holding apparatus 700, according to one embodiment. FIG. 7 illustrates the vertical post 102, the long lean arm 106, the short lean arm 108, the suspension arms 110, the first segment 112, the second segment 114, the uppermost edge 116, the free end 118, the obtuse angle 120, the lower end 122, the distal end 124, and a base drip tray 702 designed to place the soap holding apparatus 700 on the flat surface and/or on the countertop.

According to one or more embodiments, FIG. 7 shows a soap holding apparatus 700 that may comprise the base drip tray 702. The base drip tray 702 of the soap holding apparatus 700 may be designed to allow the soap holding apparatus 700 to stand securely on a surface. The base drip tray 702 may be connected to the vertical post 102 at a lower end 122 of the vertical post 102. The position of the base drip tray 702 may distribute the weight evenly. The base drip tray 702 may prevent the soap holding apparatus 700 from tipping over and may ensure that the soap holding apparatus 700 remains upright, and/or balanced when placed on a surface. The base drip tray 702 may measure between 2.00 inches and 3.25 inches long and/or 1.75 and 2.75 inches wide.

The base drip tray 702 may collect excess water and/or soap residue which may drip from the soap bar after the soap bar may be placed on the soap holding apparatus 700. The base drip tray 702 may be slightly concave and/or may include raised edges to prevent water from spilling over onto the surface. The base drip tray 702 may be removable and/or detachable from the lower end 122 of the vertical post 102 which may allow for easy cleaning and/or maintenance. Additionally, the base drip tray 702 may be interchangeable with the base 104. The base drip tray 702 may be interchanged with the base 104 using various means including but not limited to a snap-in connection, sliding mechanism, magnetic coupling, and/or adhesive bonding.

The base drip tray 702 may attach to the vertical post 102 by various means. including but not limited to, a snap-in attachment, a groove attachment, adhesive bonding, molded as a single piece with the vertical post 102, a threaded attachment, and/or magnetic coupling. This design may ensure the vertical post 102 remains stable during use which may prevent any accidental displacement of the soap holding apparatus 700.

Figure 8:
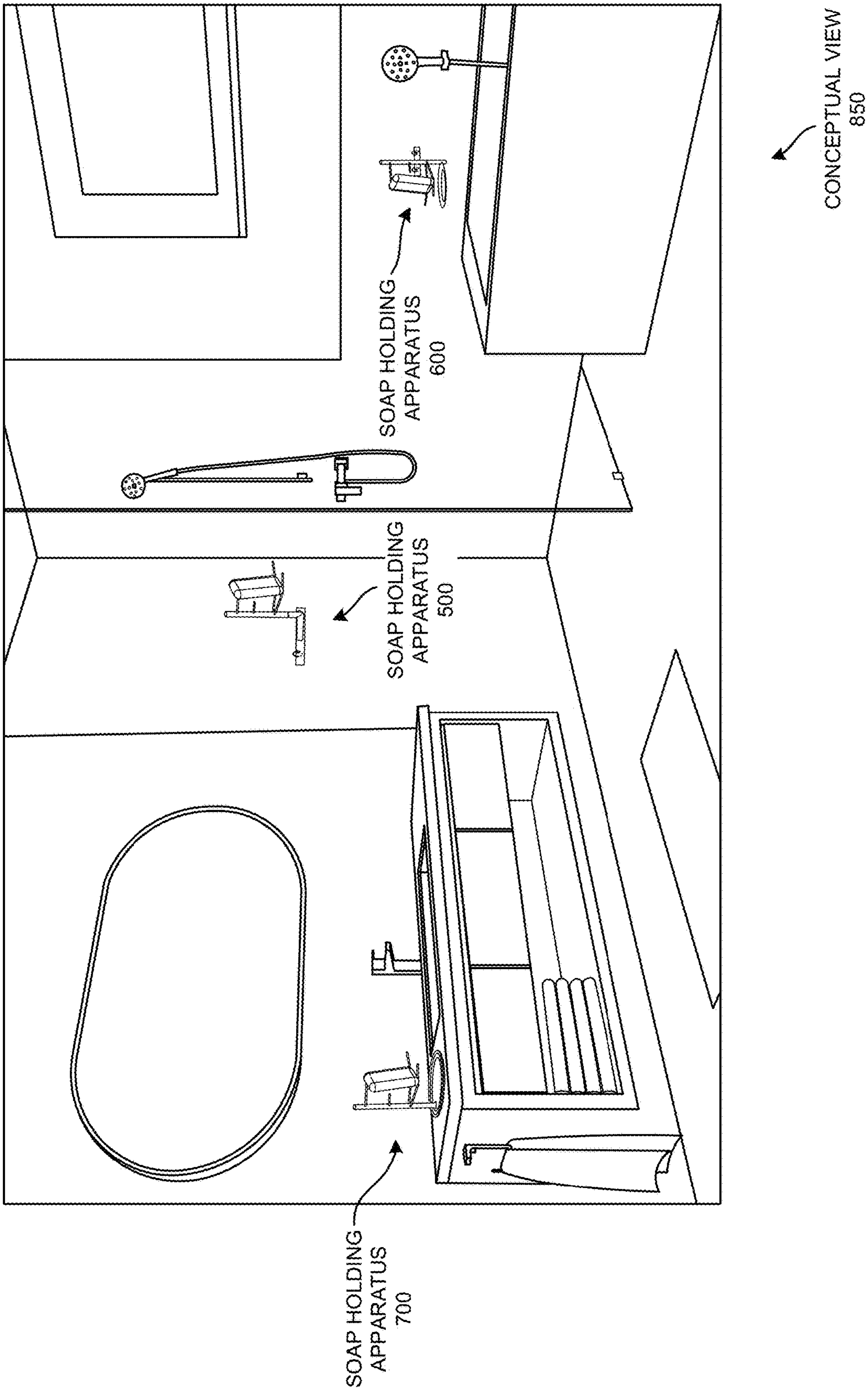
FIG. 8 is the conceptual view of the soap holding apparatus of FIGS. 1-7 installed in different areas of a bathroom environment, according to one or more embodiments.

In yet another embodiment, FIG. 8 is a conceptual view 850 of a bathroom environment, according to one embodiment. FIG. 8 illustrates multiple placements of the soap holding apparatus 100, the soap holding apparatus 500, and the soap holding apparatus 600.

The soap holding apparatus 100 may be placed on a flat surface near the sink and/or countertop. The soap holding apparatus 100 may hold soap bars of various sizes including but not limited to a large bar soap 202, medium bar soap 302, and/or small bar soap 402 to dry and/or prevent the soap from becoming soggy and/or slippery.

The soap holding apparatus 500 may be mounted in the shower area on the wall of a bathroom. The wall mount placement of the soap holding apparatus 500 may allow convenient access to the soap bar while taking a shower. The horizontal post 502 may allow the soap holding apparatus 500 to extend outward from the wall. The soap holding apparatus 500 may be mounted on the wall using various means including but not limited to screws and bolts, welded joints, adhesive bonding, interlocking, clamp or collar, and/or suction cups 508.

The soap holding apparatus 600 may be attached to the wall beside the bathtub. The bracket 506 may be attached to the various surfaces including but not limited to bathroom tiles, kitchen tiles, and/or shower walls. The bracket 602 may provide a stable foundation for wall-mounted soap holding apparatus 600. The bracket 602 may be attached to the wall using various means including but not limited to screw, magnet, double-sided tape, glue, adhesive, and/or suction cup. The bracket 602 may comprise the lap joint 604 to affix the soap holding apparatus 600. The lap joint 604 attachment may allow installation and/or uninstallation of the soap holding apparatus 600.

Figure 9:
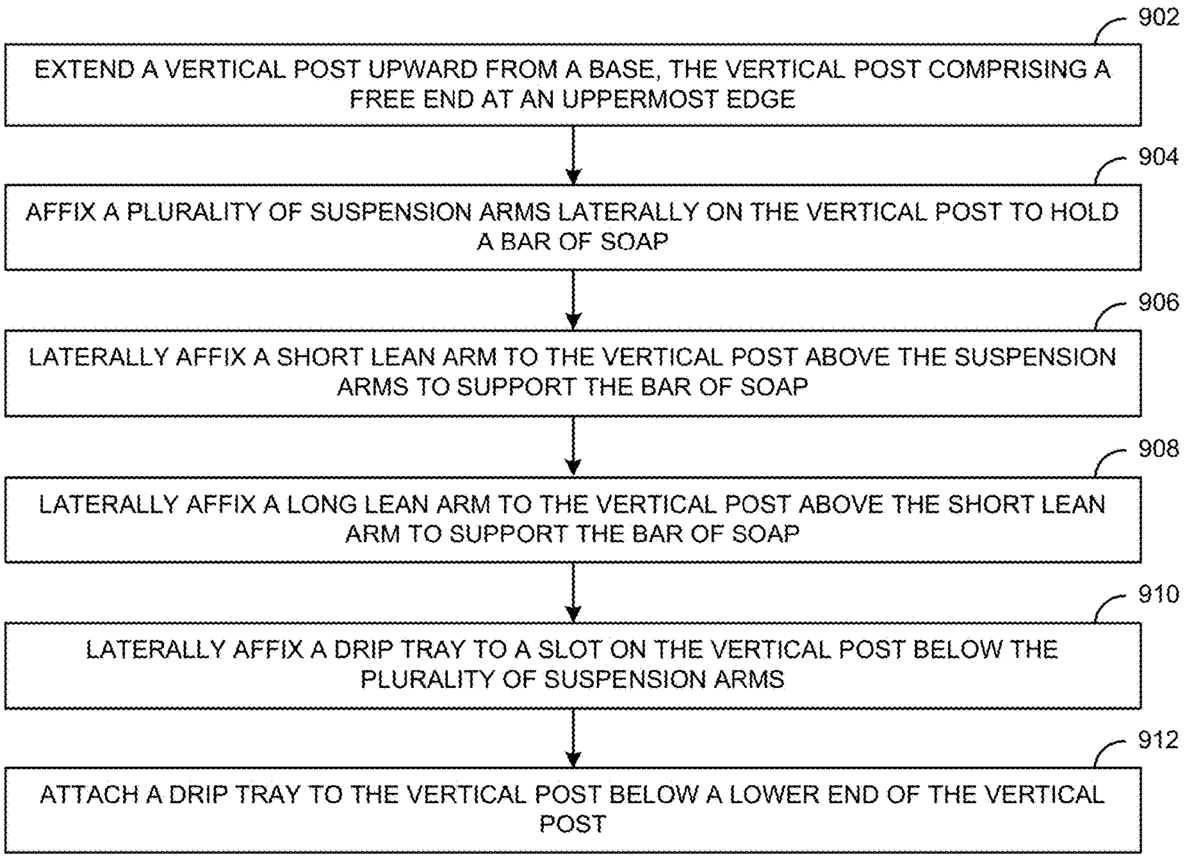
FIG. 9 is a process flow diagram illustrating a method of manufacturing the soap holding apparatuses of FIGS. 1-8, according to one or more embodiments.

FIG. 9 is a process flow diagram describing a method of manufacturing the soap holding apparatuses of FIGS. 1-8, according to one embodiment. In operation 902, a vertical post 102 may be extended upward from a base 104, the vertical post 102 may comprise a free end 118 at an uppermost edge 116. In operation 904, a plurality of suspension arms 110 may be affixed laterally on the vertical post 102 to hold a bar of soap. In operation 906, a short lean arm 108 may be laterally affixed to the vertical post 102 above the suspension arms 110 to support the bar of soap. In operation 908, a long lean arm 106 may be laterally affixed to the vertical post 102 above the short lean arm 108 to support the bar of soap. In operation 910, a drip tray 306 may be laterally affixed to a slot 304 on the vertical post 102 below the plurality of suspension arms 110. In operation 912, a drip tray 306 may be attached to the vertical post 102 below a lower end 122 of the vertical post 102.

A plain English example will now be described. Jim struggles with keeping soap dry and in place in the bathroom. The soap often ends up soggy and falls off the dish, making a mess and wasting soap. Jim found a solution in a soap holding apparatus that assists in drying the soap and holding the soap securely.

The soap holding apparatus has a vertical post and a base which provide stability even when holding a large bar of soap. The vertical post is the central support with several arms designed to hold the different sizes of soap.

A long lean arm extends horizontally from the vertical post and supports the upper part of a large bar of soap, keeping the large bar of soap elevated and away from any pooled water. This prevents the soap from becoming mushy and extends the soap's lifespan. Positioned at a variable height below the long lean arm, a short lean arm is affixed to the vertical post. The short lean arm is ideal for medium-sized soap, providing support to keep the soap in place, allowing the soap to dry quickly and evenly.

In addition to the long lean and short lean arms, the soap holding apparatus comprises suspension arms that securely hold the lower part of the bar of soap and a small bar of soap in place without slipping. The suspension arms accommodate the soap bar as it gets smaller with use. The suspension arms prevent the soap from sliding off and may ensure the soap dries efficiently. A drip tray is positioned underneath the suspension arms to catch any water or soap residue, keeping the bathroom countertop clean and dry. The drip tray is easy to detach and clean. The minimal contact area design of the soap holding apparatus minimizes or eliminates the soap from sticking to the holding arms once the soap dries. The minimal contact area simplifies the drying process and allows Jim to easily remove the soap from the soap holding apparatus with each use.

The soap holding apparatus is designed to be user-friendly making it easy for Jim to set up and use without any complicated steps. The design of the apparatus ensures that the arms are at an appropriate height reducing the need for bending or stretching. The apparatus is lightweight and portable, allowing Jim to easily move it from the sink to the shower or any other location. The drip tray can be easily adjusted or removed for cleaning or repositioning. The drainage design of the apparatus prevents soap from becoming slippery, making it easier for Jim to handle the soap during use. Jim can quickly place or remove soap from the apparatus, ensuring that the soap stays dry and ready for use with minimal effort.

Moreover, the soap holding apparatus is versatile and can be used in various settings, such as the sink area, bathtub, shower, or kitchen. Its compact and sturdy design allows Jim to move it easily from one location to another, adapting to different needs and spaces. Whether in the bathroom or any other area where soap is needed, the soap holding apparatus consistently keeps the soap dry and secure.

Over time, Jim notices that the soap lasts longer which saves Jim money and there is no more mess to clean up, which saves Jim time and effort. Jim finds that the soap-holding apparatus may make a significant difference in keeping the bathroom tidy and maintaining the soap in optimal condition for daily use.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. A soap holding apparatus comprising,
a vertical post extending upward from a base, the vertical post comprising a free end at an uppermost edge;
a plurality of suspension arms affixed laterally on the vertical post to hold a bar of soap,
wherein each of the plurality of the suspension arms is divided into two segments,
wherein each of the plurality of suspension arms comprises a first segment that laterally affixes each of the plurality of suspension arms to the vertical post, and
wherein each of the plurality of suspension arms comprises a second segment extending from a distal end of the first segment at an obtuse angle,
a short lean arm laterally affixed to the vertical post above the suspension arms to support the bar of soap;
and
a long lean arm laterally affixed to the vertical post above the short lean arm to support the bar of soap.

2. The soap holding apparatus of claim 1 further comprising:
a drip tray laterally affixed to a slot on the vertical post below the plurality of suspension arms,
wherein the drip tray collects water dripping from the bar of soap when the bar of soap is held by the plurality of suspension arms.

3. The soap holding apparatus of claim 2 wherein:
the drip tray is removably attached to the slot on the vertical post below the suspension arms.

4. The soap holding apparatus of claim 1 further comprising:
a drip tray attached to the vertical post below a lower end of the vertical post,
wherein the drip tray is the base for the soap holding apparatus,
wherein the drip tray collects water dripping from the bar of soap when the bar of soap is held by the plurality of suspension arms.

5. The soap holding apparatus of claim 1 wherein:
the second segment that extends from the distal end of the first segment creates the obtuse angle,
the obtuse angle ranges between 130-degrees and 180-degrees to support the bar of soap and to prevent the bar of soap from slippage.

6. The soap holding apparatus of claim 1 wherein:
the base comprises a plurality of legs extending outwardly from the lower end of the vertical post to support the soap holding apparatus.

7. The soap holding apparatus of claim 1 wherein:

the soap holding apparatus is made from at least one of plastic, stainless steel, aluminum, titanium, wood, and ceramic material.

8. A soap holding apparatus comprising:

a vertical post extending upward from a base, the vertical post comprising a free end at an uppermost edge;

a plurality of suspension arms affixed laterally on the vertical post to hold a bar of soap, wherein each of the plurality of suspension arms is divided into two segments, wherein each of the plurality of suspension arms comprises a first segment that laterally affixes each of the plurality of suspension arms to the vertical post, and wherein each of the plurality of suspension arms comprises a second segment extending from a distal end of the first segment at an obtuse angle;

a short lean arm laterally affixed to the vertical post above the suspension arms to support the bar of soap;

a long lean arm laterally affixed to the vertical post above the short lean arm to support the bar of soap; and a drip tray laterally affixed to a slot on the vertical post below the plurality of suspension arms, wherein the drip tray collects water dripping from the bar of soap when the bar of soap is held by the plurality of suspension arms.

9. The soap holding apparatus of claim 8, wherein the drip tray is removably attached to the slot on the vertical post below the suspension arms.

10. The soap holding apparatus of claim 8, wherein the drip tray is attached to the vertical post via the slot by at least one of a slide-in attachment, a snap-on attachment, a magnetic attachment, a bracket or hook attachment, and a twist-lock attachment.

11. The soap holding apparatus of claim 8, wherein the second segment that extends from the distal end of the first segment creates the obtuse angle, the obtuse angle ranges between 130-degrees and 180-degrees to support the bar of soap and to prevent the bar of soap from slippage.

12. The soap holding apparatus of claim 8, wherein the base comprises a plurality of legs extending outwardly from a lower end of the vertical post to support the soap holding apparatus.

13. The soap holding apparatus of claim 8, wherein the soap holding apparatus is made from at least one of plastic, stainless steel, aluminum, titanium, wood, and ceramic material.

14. The soap holding apparatus of claim 8, wherein the long lean arm comprises a length between 0.5 inches and 1.25 inches, and the short lean arm comprises a length between 0.25 inches and 1.00 inches, and the short lean arm is shorter in length than the long lean arm.

* * * * *